United States Patent Office 3,522,239
Patented July 28, 1970

3,522,239
AMINOETHER DERIVATIVES OF 9,10-ETHANO-9,10-DIHYDRO-ANTHRACENE
Jacques Robert Boissier, Paris, and Roger Ratouis, Saint-Cloud, France, assignors to Société Industrielle pour la Fabrication des Antibiotiques (S.I.F.A.), Paris, France, a French company
No Drawing. Filed June 21, 1966, Ser. No. 564,466
Claims priority, application France, July 1, 1965, 23,093; July 8, 1965, 23,942; Oct. 7, 1965, 34,100
Int. Cl. C07d 41/04; C07c 93/06, 93/08
U.S. Cl. 260—239  6 Claims

ABSTRACT OF THE DISCLOSURE

The products are new aminoether derivatives of 9,10-ethano-9,10-dihydro-anthracene and acid addition and quaternary ammonium salts thereof, said new aminoether derivatives corresponding to the formula:

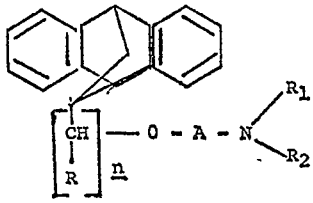

(1)

where $n$ is 0, 1 or 2, R represents hydrogen or a methyl radical (when $n=2$, R can only represent hydrogen), A represents a linear or branched alkylene radical with two to four carbon atoms, and $R_1$ and $R_2$, which may be the same or different, represent hydrogen atoms or lower alkyl radicals or, together with the nitrogen atom N, form a heterocyclic radical such as pyrrolidino, piperidino, morpholino or hexamethyleneimino.

The aminoether derivatives are anti-Parkinson and anti-cholinergic medicaments.

---

This invention relates to new aminoether derivatives of 9,10-ethano-9,10-dihydro-anthracene and to their acid addition and quaternary ammonium salts. The invention also relates to a process for the preparation of these products.

The products according to the invention have proved to be particularly useful in human therapy, particularly as anti-Parkinson and anti-cholinergic medicaments.

The new aminoether derivatives of 9,10-ethano-9,10-dihydro-anthracene according to the invention correspond to the general formula:

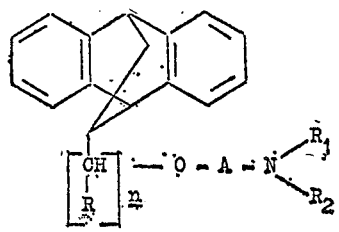

(1)

in which $n$ is 0, 1 or 2, R represents hydrogen or a methyl radical (when $n=2$, R can only represent hydrogen), A represents a linear or branched alkylene radical with two to four carbon atoms, and $R_1$ and $R_2$, which may be the same or different, represent hydrogen atoms or lower alkyl radicals or, together with the nitrogen atom N, form a heterocyclic radical such as pyrrolidino, piperidino, morpholino or hexamethyleneimino. By lower alkyl radicals is meant radicals having 4 carbon atoms at the most.

According to the invention, the aminoethers of Formula 1 may be prepared by the processes described below:

(1) A first process in which a compound corresponding to the general formula:

(2)

in which X represents a halogen atom or a benzenesulphonyl, toluenesulphonyl or methanesulphonyl radical, whilst A, $R_1$, and $R_2$ are as defined above, is reacted with an alcohol derivative of 9,10-ethano-9,10-dihydro-anthracene of the general formula

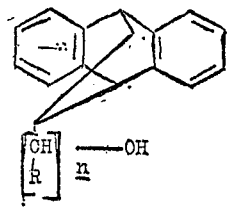

(3)

in which $n$ and R are as defined above, in the presence of an alkaline agent capable of combining with the acid formed during the reaction, after which the resulting product corresponding to the general Formula 1 above is isolated.

In a preferred embodiment of this process, the procedure is as follows:

An alcohol corresponding to Formula 3 and an alkaline agent are mixed together and reacted with a large excess of the compound corresponding to Formula 2 in relation to the requisite stoichiometric quantity relatively to the alcohol (advantageously twice this quantity).

In cases where a compound corresponding to Formula 2 in which X is an halogen atom is used, this compound is preferably employed in the form of its salt with a hydracid. In this case, the quantity of alkaline agent added to the reaction medium has to be increased.

It is of advantage to add the compound of Formula 2 in two portions to a mixture containing the alkaline agent and the alcohol corresponding to Formula 3 in solution in a solvent such as benzene or toluene. The alkaline agent may be, for example, anhydrous sodium or potassium hydroxide. It is used in a large excess, the reaction being carried out with stirring at the temperature at which the reaction medium boils.

One completion of the reaction, the mineral compounds are separated by filtration and the product of general Formula 1 is isolated by rectifying the filtrate or by any other conventional means.

In a modification of this first process, the alcohol corresponding to Formula 3 and the alkaline agent may be replaced by a metallic salt of this said alcohol prepared either by the direct action of a metal such as sodium, potassium or lithium on the alcohol, or by double decomposition between the alcohol of Formula 3 and a derivative of the metal retained such as, for example, sodium hydride, sodium ethylate or potassium ethylate, phenyl lithium or butyl lithium.

The other reaction conditions are not modified. The preparation is completed in the absence of an alkaline agent except when the compound of Formula 2 is used in the form of its salt with a hydracid according to one of the preferred conditions referred to above.

It should be noted that when this first process is based on a compound of Formula 2 having the following structure:

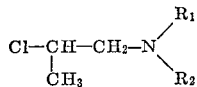

($R_1$ and $R_2$ being as defined above), there is obtained at the end of the reaction a mixture of the required substance, i.e., that in which the radical linked to the oxygen has the formula:

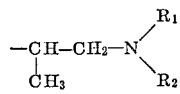

and of the rearranged compound, i.e., that in which the radical linked to the oxygen corresponds to the formula:

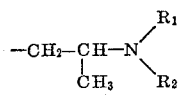

In this case, the two constituents have to be separated; this may be done by conventional means such as fractional distillation or crystallisation.

(2) A second process in which anthracene is reacted, while heating with a compound corresponding to the general formula:

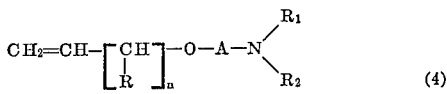 (4)

in which $n$, R, A, $R_1$ and $R_2$ are as defined above, after which the resulting product corresponding to the general Formula 1 is isolated.

In a preferred embodiment of this process, the procedure is as follows:

Equimolar quantities of anthracene and of the compound corresponding to general Formula 4 are mixed in the presence of a solvent such as benzene or toluene, and the resulting mixture is heated for several hours in an autoclave to a temperature in the range of from 100° C. to 250° C., preferably from 200° C. to 210° C.

On completion of the reaction, the product corresponding to the general Formula 1 is isolated by rectification or by any other conventional means.

The compounds corresponding to the general Formula 4 may be prepared by conventional means such as, for example, the action of a bromide corresponding to the general formula:

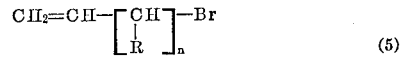 (5)

on the sodium derivative of an alcohol corresponding to the general formula:

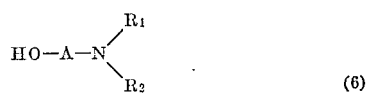 (6)

The reaction is preferably carried out in the presence of a solvent such as benzene or toluene at the temperature at which the reaction mixture boils. Following filtration of the reaction medium, the compounds of Formula 4 are isolated by rectification or by any other conventional means.

The aminoethers corresponding to general Formula 1 have a basic character and, according to the invention, their acid addition salts may be prepared by the action of corresponding inorganic or organic acids on these aminoethers, preferably in the presence of a solvent. Anhydrous solvents are preferably used such as, for example, benzene, ethyl ether, ethanol and acetone. According to the invention, the quaternary ammonium salts may be prepared by the action of corresponding quaternising agents on the aminoethers of Formula 1 in the presence of a solvent. Anhydrous solvents such as, for example, ethylether, acetonitrile, acetone, dioxan, methanol, ethanol, are preferably used. The salts may optionally be prepared without isolating the aminoether of general Formula 1 from the reaction medium from which it was obtained.

The new aminoethers of general Formula 1 and their acid addition and quaternary ammonium salts exhibit extremely interesting pharmacological properties. In particular, they are remarkable in their anti-Parkinson activity and, in addition, are also highly effective anti-cholinergics.

Pharmacological investigation of these new substances was based on the following factors:

(a) *Acute toxicity.*—The lethal dose 50 was determined intraperitoneally on mice. The results are set out in the following table.

(b) *Nicotine test.*—Carried out in accordance with the method of Bovet and Longo (Journ. Pharmacol. Exp. Therap. 1951, 102, p. 22).

In a preliminary test, rabbits were selected which responded to the injection of 1 mg./kg. of nicotine tartrate into the marginal vein of the ear by tonicoclonic muscular spasms readily recordable at the level of the hind legs. At least 24 hours after the preceding selection, the derivative under investigation was administered by intravenous injection, followed by the administration, again intravenously, of 1 mg./kg. of nicotine tartrate after intervals of 10 minutes, 1 hour, 2 hours, 6 hours and 24 hours. Each derivative was injected in three doses of 1, 2 and 5 mg./kg., three rabbits being used for each dose. The minimum dose of the derivative under investigation which ensured total protection of the animals for at least 2 consecutive hours, is given in the following table.

(c) *Anti-cholinergic activity.*—This was evaluated on an isolated guinea pig's ileum in accordance with the Magnus technique. The derivative under investigation was added to a Tyrode bath 30 seconds before the addition of a dose of acetyl choline which produced a submaximal contraction beforehand. The responses observed at different inhibitor concentrations enabled the 50% inhibiting concentration to be calculated as shown in the following table.

Table

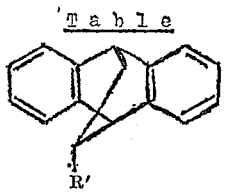

| R' | Salt used | No. of corresponding example | DL₅₀ mg./kg. i.p. | Protective doses mg./kg. with respect to nicotine | Anti-cholinergic power CI₅₀ |
|---|---|---|---|---|---|
| $O(CH_2)_2N(CH_3)_2$ | Acid maleate | 8 | 95 | 2 | $2.10^{-7}$ |
| $O(CH_2)_2N(C_2H_5)_2$ | Cyclohexyl sulphamate | 1 | 100 | 2 | $2.10^{-6}$ |
| $O(CH_2)_2N\langle\text{piperidine}\rangle$ | Acid fumarate | 14 | 90 | 5 | $10^{-6}$ |
| $O(CH_2)_3N(CH_3)_2$ | do | 7 | 77 | 5 | $5.10^{-7}$ |
| $CH_2O(CH_2)_2N(CH_3)_2$ | Hydrochloride | 4 | 110 | 5 | $10^{-7}$ |
| $CH_2O(CH_2)_2N(C_2H_5)_2$ | Cyclohexylsulphamate | 2 | 95 | 1 | $2.10^{-6}$ |
| $CH_2O(CH_2)_2N\langle\text{pyrrolidine}\rangle$ | Hydrochloride | 11 | 75 | 2 | $5.10^{-7}$ |
| $CH_2O(CH_2)_2N\langle\text{piperidine}\rangle$ | do | 5 | 85 | 1 | $10^{-6}$ |
| $CH_2O(CH_2)_2N\langle\text{pyrrolidine}\rangle$ | do | 12 | 65 | 2 | $2.10^{-7}$ |
| $CH_2O(CH_2)_2N\langle\text{morpholine}\rangle O$ | do | 13 | 270 | 5 | $2.10^{-6}$ |
| $\underset{CH_3}{CH}-O(CH_2)_2N(CH_3)_2$ | Acid maleate | 9 | | | $10^{-6}$ |
| $CH_2O(CH_2)_3N(CH_3)_2$ | Hydrochloride | 6 | 85 | 5 | $2.10^{-7}$ |
| $CH_2OCH_2-\underset{CH_3}{CH}-N(CH_3)_2$ | do | 10 | 80 | 1 | $3.10^{-8}$ |
| $CH_2O\underset{CH_3}{CH}-CH_2-N(CH_3)_2$ | do | 15 | 80 | 5 | $2.10^{-7}$ |
| $(CH_2)_2O(CH_2)_2N(CH_3)_2$ | do | 3 | 120 | 2 | $10^{-6}$ |

It is apparent that the derivatives under investigation show a marked protective activity with respect to tremors caused by nicotine, and a marked parasympatholytic activity.

The new derivatives have also proved to be effective against the tremors normally caused by the injection of tremorine. Four of them, namely the acid maleate of 11 - (2 - dimethylaminoethoxy)-9,10-ethano-9,10-dihydro-anthracene, the hydrochloride of 11-(2-dimethyl-amino-ethoxymethyl)-9,10-ethanol-9,10-dihydro-anthracene, the acid fumarate of 11 - (2 - piperidinoethoxy)-9,10-ethano-9,10-dihydro-anthracene and the hydrochloride of 11-(2-dimethylaminopropoxymethyl) - 9,10 - ethano - 9,10-dihydro-anthracene, show a particularly remarkable activity. It was in fact found that they provide protection when administered in doses below 5 mg./kg. (The derivatives were administered intraperitoneally to mice 30 minutes before the injection, by the same route, of 20 mg./kg. of tremorine.)

By virtue of their highly interesting pharmacological properties, the aminoethers of Formula 1 and their salts according to the invention constitute medicaments which can be used to great effect in human therapy, particularly in the treatment of Parkinson's disease. They may also be used as anti-cholinergics, for example in the treatment of spasmodic disorders affecting the digestive tube. They may be administered either by the digestive route or parenterally. The active dose varies in dependence upon the seriousness of the cases, upon the product used and upon the nature of the disorders to be treated. For example, it may be between 5 and 500 mg. per day administered orally to human beings.

In their application as medicaments, the new products according to the invention may be used either in the form of bases or in the form of pharmaceutically acceptable acid addition or quaternary ammonium salts. Preferred acid addition salts are those obtained with hydrochloric acid, hydrobromic acid, hydriodic acid, nitric acid, sulphuric acid, phosphoric acid, acetic acid, maleic acid, fumaric acid, tartaric acid, benzoic acid, cinnamic acid and cyclohexylsulphamic acid, whilst preferred quaternary ammonium salts are those obtained with alkyl halides such as, for example, methyl chloride, bromide or iodide, hydroxyalkyl halides such as, for example, 2-hydroxyethyl chloride, bromide or iodide, alkyl sulphates such as, for example, dimethyl sulphate and alkyl-alkane sulphonates or alkyl-arene sulphonates such as methylmethane sulphonate, methyl benzene sulphonate or toluene sulphonate.

The present invention also relates to the pharmaceutical compositions containing as active principals one or more of the products corresponding to the general Formula 1 and/or their salts. These compositions are prepared in such a way as to be administrable either by the digestive or by the parenteral route. They may be solids or liquids, and may be presented in the pharmaceutical forms commonly used in human medicine such as, for example, tablets, dragees, gelatin capsules, granules, suppositories or injections. They are prepared by the usual methods. The active principal(s) may be incorporated in them in the excipients commonly used in these pharmaceutical compositions such as, for example, talcum, gum arabic, lactose, starch, magnesium stearate, cocoa butter, aqueous or nonaqueous vehicles, various wetting agents, dispersants or emulsifiers and preservatives.

Since two of the alcohol derivatives of 9,10-ethano-9,10-dihydro-anthracene coresponding to the general Formula 3 and used as starting materials, are new, a process for their preparation is given in Examples 19 and 20.

The invention is ilustrated by the following non-limiting examples:

EXAMPLE 1

11-(2-diethylaminoethoxy)-9,10-ethano-9,10-dihydro-anthracene and cyclohexylsulphamate A mixture of 22.2 g. (0.1 mol) of 9,10-ethano-9,10-dihydro-11-anthrol, 17.2 g. (0.1 mol) of 2-diethylamino chloroethane hydrochloride and 16 g. (0.4 mol) of finely powdered anhydrous sodium/hydroxide in 200 ml. of anhydrous benzene, is heated with stirring until it boils under reflux. After 7 hours, 17.2 g. (0.1 mol) of 2-diethylaminochloro-ethane hydrochloride are added, and the mixture is heated for 15 hours with stirring until it boils under reflux. After cooling, the reaction mixture is filtered and the filtrate is concentrated in vacuo. The resulting oily residue is distilled, 26 g. (81%) of 11-(2-diethylaminoethoxy) - 9,10 - ethano-9,10-dihydro-anthracene being obtained in the form of a colourless oil which boils at 160° C.–163° C./0.2 mm. of mercury.

22 g. of the above base are dissolved in 100 ml. of acetone and 12 g. of cyclohexylsulphamic acid in solution in 50 ml. of actone are added to the resulting solution. The solution thus obtained is heated to boiling point and 300 ml. of anhydrous ether are then added thereto. The product is left to cool and the resulting crystals are centrifuged. 22 g. of 11-(2-diethylaminoethoxy)-9,10-ethano-9,10-dihydroanthracene cyclohexylsulphamate are obtained in the form of white crystals. M.P.: 95° C.–98° C. as measured on a heating-stage microscope.

*Analysis.*—Calc'd for $C_{28}H_{40}N_2O_4S$ (percent): C, 67.2; H, 8.1. Found (percent): C, 67.1; H, 8.1.

EXAMPLE 2

11-(2-diethylaminoethoxymethyl)-9,10-ethano 9,10-dihydroanthracene and cyclohexylsulphamate The procedure is as in Example 1, except that 23.6 g. (0.1 mol) of 9,10-ethano-9,10-dihydro-11-anthryl-methanol are used. After distillation, 21 g. (64%) of 11-(2-diethylaminoethoxymethyl) - 9,10 - ethano - 9,10-dihydro-anthracene are obtained in the form of a colourless oil which boils at 165° C.–170° C. 0.1 mm. of mercury.

15 g. of 11-(2-diethylaminoethoxymethyl)-9,10-ethano-9,10-dihydroanthracene-cyclohexylsulphamate are obtained from 20 g. of the above base and 11.5 g. of cyclohexyl sulphamic acid after recrystallisation from a mixture of acetone and ethanol. This salt is in the form of white crystals. M.P.: 141° C.–142° C., as measured on a heating-stage microscope.

*Analysis.*—Calc'd for $C_{29}H_{42}N_2O_4S$ (percent): C, 67.7; H. 8.2. Found (percent): C, 67.6; H, 8.3.

EXAMPLE 3

11-[2-(2-dimethylaminoethoxy)-ethyl]-9,10-ethano-9,10-dihydro-anthracene and its hydrochloride The procedure is as in Example 1, except that 25 g. (0.1 mol) of 2-(9,10-ethano-9,10-dihydro-11-anthryl)-ethanol and 28.8 g. (0.2 mol) of 2-dimethylamino-chloro-ethane hydrochloride are used. 14.8 g. (46%) of 11-[2-(2-dimethylaminoethoxy) - ethyl] - 9,10-ethano-9,10-dihydroanthracene are obtained by distillation in the form of a colourless oil which boils at 170° C./0.1 mm. of mercury.

8 g. of the above base are dissolved in 100 ml. of anhydrous ether and a stoichiometric quantity of hydrochloric acid, in the form of a 7% solution in absolute ethanol, is added to the resulting solution. A precipitate is formed which is centrifuged after standing for 15 hours at 0° C. It is recrystallised from a mixture of acetone and acetonitrile, 6.4 g. of 11-[2-(2-dimethylaminoethoxy)-ethyl]-9,10-ethano-9,10 - dihydroanthracenehydrochloride being obtained in the form of white crystals. M.P. 168° C.–170° C. as measured on a heating stage microscope.

*Analysis.*—Calc'd for $C_{22}H_{28}ClNO$ (percent): C, 73.8; H, 7.9. Found (percent): C, 73.6; H, 8.0

EXAMPLE 4

11-(2-dimethylaminoethoxymethyl)-9,10-ethano-9,10-dihydro-anthracene hydrochloride A mixture of 29.5 g. (0.125 mol) of (9,10-ethano-9,10-dihydro-11-anthryl)-methanol, 18 g. (0.125 mol) of 2-dimethylaminochloroethane hydrochloride and 20 g. (0.5 mol) of finely powdered anhydrous sodium hydroxide in 200 ml. of anhydrous benzene is heated with stirring until it boils under reflux. After 7 hours, 18 g. (0.125 mol) of 2-dimethyl-aminochloroethane hydrochloride are added, and the resulting mixture is reheated for 15 hours with stirring until it boils under reflux. After cooling, the reaction mixture is filtered and filtrate is concentrated in vacuo to remove the benzene and any unreacted components. The residue obtained is taken up in 200 ml. of anhydrous ether and hydrochloric acid, in the form of a 7% solution in absolute ethanol, is added thereto until it turns acid. A precipitate is formed which is centrifuged after standing for 15 hours at 0° C. After drying, 30 g. (70%) of 11 - (2-dimethylamino-ethoxymethyl) - 9,10-ethano - 9,10 - dihydroanthracene hydrochloride are obtained in the form of white crystals, M.P.: 194° C., as measured on a heating-stage microscope after recrystallisation from acetonitrile.

*Analysis.*—Calc'd for $C_{21}H_{26}ClNO$ (percent): C, 73.3; H, 7.6. Found (percent): C, 72.8; H, 7.7.

EXAMPLE 5

11-(2-piperidinoethoxymethyl)-9,10-ethano-9,10-dihydro anthracene hydrochloride

The procedure is as in Example 4, except that 18.9 g. (0.08 mol) of (9,10 - ethano - 9,10 - dihydro-11-anthryl) methanol, 29.4 g. (0.16 mol) of 2-piperidinochloroethane hydrochloride and 12.8 g. (0.32 mol) of anhydrous sodium hydroxide in 200 ml. of anhydrous benzene are used. 19.5 g. (65.5%) of 11-(2-piperidinoethoxymethyl)-9,10 - ethano-9,10-dihydroanthracene hydrochloride are obtained in the form of white crystals. M.P.: 207° C.–208° C., as measured on a heating-stage microscope after recrystallisation from water.

*Analysis.*—Calc'd for $C_{24}H_{30}ClNO$ (percent): C, 75.1; H, 7.9. Found (percent): C, 74.9; H, 7.7.

EXAMPLE 6

11-(3-dimethylaminopropoxymethyl)-9,10-ethano-9,10-dihydro anthracene hydrochloride The procedure is as in Example 4, except that 15 g. (0.064 mol) of 9,10 - ethano-9,10-dihydro-11-anthryl)-methanol, 20.2 g. (0.128 mol) of 3-dimethylamino-1-chloropropane hydrochloride and 10.5 g. (0.256 mol) of anhydrous sodium hydroxide in 200 ml. of anhydrous benzene are used. 11.4 g. (50%) of 11-(3-dimethylamino-propoxymethyl)-9,10-ethano-9,10-dihydro anthracene hydrochloride are obtained in the form of white crystals, M.P.: 165° C., as measured on a heating-stage microscope after recrystallisation from acetonitrile.

*Analysis.*—Calc'd for $C_{22}H_{28}ClNO$ (percent): C, 73.8; H, 7.9. Found (percent): C, 73.7; H, 7.7.

EXAMPLE 7

Acid fumarate of 11-(3-dimethylaminopropoxy)-9,10-ethano-9,10-dihydro-anthracene A mixture of 11.1 g. (0.05 mol.) of 9,10-ethano-9,10-dihydro-11-anthrol, 7.9 g. (0.05 mol) of 3-dimethylamino-1-chloropropane hydrochloride and 8 g. (0.2 mol)

of finely powdered anhydrous sodium hydroxide in 200 ml. of anhydrous benzene, is heated with stirring until it boils under reflux. After 7 hours, 7.9 g. (0.05 mol) of 3-dimethylamino - 1 - chloropropane hydrochloride are added, and the resulting mixture is heated with stirring for 15 hours until it boils under reflux. After cooling, the reaction mixture is filtered. The filtrate is washed with water and concentrated in vacuo in order to remove the benzene and any unreacted components. 11.2 g. of a residue are obtained which are taken up in 50 ml. of acetone. 4.3 g. of fumaric acid are then added, the mixture is heated until it boils and ether is added thereto until precipitation commences. After standing for 15 hours at 0° C., the resulting crystals are suction-filtered and then recrystallised from a mixture of acetonitrile and ether. 8 g. of the acid fumarate of 11 - (3-dimethylamino-propoxy)-9,10-ethano-9,10-dihydro-anthracene in the form of white crystals are obtained, M.P.: 148° C., as measured on a heating-stage microscope.

*Analysis.*—Calc'd for $C_{25}H_{29}NO_5$ (percent): C, 70.9; H, 6.9. Found (percent): C, 70.6; H, 6.7.

EXAMPLE 8

Acid maleate of 11-(2-dimethylaminoethoxy)-9,10-ethano-9,10-dihydro-anthracene

The procedure is as in Example 7, except that 14.4 g. (0.1 mol) of 2-dimethylaminochloroethane hydrochloride are used. The acid maleate of 11-(2-dimethylaminoethoxy)-9,10-ethano-9,10-dihydro-anthracene is obtained by the addition of maleic acid to the concentration residue. The product is recrystallised from acetone. M.P.: 171° C., as measured on a heating-stage microscope.

*Analysis.*—$C_{24}H_{27}NO_5$ (percent): C, 70.4; H, 6.7. Found (percent): C, 70.6; H, 6.8.

EXAMPLE 9

Acid maleate of 11-[1-(2-diethylaminoethoxy)-ethyl]-9,10-ethano-9,10-dihydro-anthracene The procedure is as in Example 7, except that 12.5 g. (0.05 mol) of 1-(9,10-ethano-9,10-dihydro-11-anthryl)-ethanol and 14.4 g. (0.1 mol) of 2-dimethylaminochloroethane hydrochloride are used. The acid maleate of 11-[1 - (2-dimethylaminoethoxy)-ethyl]-9,10 - ethano-9,10-dihydroanthracene is obtained by adding maleic acid to the concentration residue. The product is recrystallised from a mixture of acetone and ether. M.P.: 149° C., as measured on a heating-stage microscope.

*Analysis.*—$C_{26}H_{31}NO_5$ (percent): C, 71.4; H, 7.1. Found (percent): C, 71.2; H, 7.2.

EXAMPLE 10

11-(2-dimethylaminopropoxymethyl)-9,10-ethano-9,10-dihydro-anthracene hydrochloride 70.8 g. (0.3 mol) of (9,10-ethano-9,10-dihydro-11-anthryl)-methanol are added in portions under a dry nitrogen atmosphere to a solution of phenyl lithium prepared from 51.8 g. (0.33 mol) of bromobenzene and 4.6 g. (0.66 at.-g.) of lithium in 300 ml. of anhydrous ether. On completion of the addition, the ether is removed by distillation, and 300 ml. of anhydrous toluene are simultaneously added.

44 g. (0.36 mol) of amine, (prepared from an aqueous solution of 1-dimethylamino-2-chloropropane hydrochloride by the addition of an aqueous sodium hydroxide solution, followed by extraction of the resulting oil with ether, concentration and distillation B.P.=120° C.–126° C.) in solution in 50 ml. of anhydrous toluene, are slowly added to the resulting mixture cooled to room temperature.

The reaction mixture is heated to reflux with stirring for 15 hours, cooled and filtered and the filtrate is washed with water and then extracted with a dilute aqueous solution of hydrochloride acid. The acid solution is made alkaline by the addition of a sodium hydroxide solution and the resulting oil extracted with ether. It is dried and then concentrated. 47.4 g. of a mixture of 11-(2-dimethylaminopropoxymethyl)-9,10-ethano-9,10 - dihydro-anthracene and 11-[(1-dimethyl - amino-2-propoxy)-methyl]-9,10-ethano-9,10-dihydro-anthracene are obtained by distillation. B.P.: 160° C.–170° C./0.1 mm. of mercury.

The above oil is dissolved in 250 ml. of anhydrous ether and a stoichiometric quantity of hydrochloric acid, in the form of a 7% solution in absolute ethanol, is added with cooling. The product is concentrated to dryness in vacuo, the residue is taken up in 200 ml. of anhydrous ether and the white precipitate formed is centrifuged. 46.5 G. of a mixture of the hydrochlorides of the two aforementioned bases are obtained. Analysis shows that approximately 80% of this mixture consists of 11-(2-dimethyl - aminopropoxymethyl) - 9,10 - ethano-9,10-dihydro-anthracene hydrochloride and 20% of 11-[(1-dimethylamino-2-propoxy) - methyl] - 9,10-ethano-9,10-dihydro-anthracene hydrochloride. Its instantaneous melting point is 168° C.

The mixture of the two above salts is dissolved in 100 ml. of boiling acetonitrile. After standing at 0° C., white crystals are formed which are centrifuged and dried. In this way, 24 g. of pure 11-(2-dimethylaminopropoxymethyl)-9,10-ethano - 9,10 - dihydro-anthracene hydrochloride are obtained in the form of white crystals. M.P.: 181° C.–182° C., as measured on a heating-stage microscope.

*Analysis.*—$C_{22}H_{28}ClNO$ (percent): C, 73.8; H, 7.9. Found (percent): C, 73.8; H, 7.9.

EXAMPLE 11

11-(2-pyrrolidino-ethoxymethyl)-9,10-ethano-9,10-dihydro-anthracene hydrochloride 23.6 g. (0.1 mol) of (9,10-ethano-9,10-dihydro-11-anthryl)-methanol are added in portions under a dry nitrogen atmosphere to a solution of phenyl lithium prepared from 17.3 g. (0.11 mol) of bromobenzene and 1.54 g. (0.22 at.-g.) of lithium in 200 ml. of anhydrous eher. On completion of the addition, the ether is removed by distillation and 200 ml. of anhydrous toluene are simultaneously added.

A solution of 16 g. (0.12 mol) of 2-pyrrolidino- chloro-ethane (distilled) in 20 ml. of anhydrous toluene is slowly added to the above mixture cooled to room temperature. The reaction mixture is heated with stirring for 15 hours until it boils under reflux. It is cooled and filtered, and the filtrate is washed with water and concentrated to dryness in vacuo. The concentration residue is taken up in 200 ml. of anhydrous ether, and hydrochloric acid, in the form of a 7% solution in absolute ethanol, is added thereto until it turns acid. After standing for 15 hours at 0° C., the resulting precipitate is centrifuged and then recrystallised from acetonitrile. The hydrochloride of 11-(2-pyrrolidinoethoxymethyl) - 9,10 - ethano-9,10-dihydro-anthracene is obtained in the form of white crystals. M.P.: 203° C.–207° C., as measured on a heating-stage microscope.

*Analysis.*—Calc'd for $C_{23}H_{28}ClNO$ (percent): C, 74.7; H, 7.6. Found (percent): C, 74.8; H 7.6.

EXAMPLE 12

11-(2-hexamethylene-imino-ethoxymethyl)-9,10-ethano-9,10-dihydro-anthracene hydrochloride The procedure is as in Example 11, except that 19.4 g. (0.12 mol) of 2-hexamethylene-imino-chloroethane are used. The hydrochloride of 11-(2-hexamethylene-imino-ethoxymethyl)-9,10-ethano-9,10 - dihydro - anthracene is obtained in the form of white crystals after recrystallisation from acetonitrile. M.P.: 181° C.–184° C., as measured on a heating-stage microscope.

*Analysis.*—Calc'd for $C_{25}H_{32}ClNO$ (percent): C, 75.4; H, 8.1. Found (percent): C, 75.4; H, 8.2.

EXAMPLE 13

11-(2-morpholino-ethoxymethyl)-9,10-ethano-9,10-dihydro-anthracene hydrochloride The procedure is as in Example 11, except that 17.95 g. (0.12 mol) of 2-morpholinochloroethane are used. The hydrochloride of 11-(2-morpholino-ethoxymethyl)-9,10-ethano-9,10-dihydro-anthracene is obtained in the form of white crystals after recrystallisation from ethanol. M.P.: 218° C.–220° C., as measured on a heating-stage microscope.

*Analysis.*—Calc'd for $C_{23}H_{28}ClNO_2$ (percent): C, 71.6; H, 7.3. Found (percent): C, 71.4; H, 7.3.

EXAMPLE 14

Acid fumarate of 11-(2-piperidino-ethoxy)-9,10-ethano-9,10-dihydro-anthracene

A solution of 11.1 g. (0.05 mol) of 9,10-ethano-9,10-dihydro-11-anthrol in 100 ml. of absolute ethanol is slowly added in a dry nitrogen atmosphere to a solution of sodium ethylate prepared from 115 g. (0.05 at.-g.) of sodium in 50 ml. of absolute ethanol. The resulting solution is heated for 1 hour until it boils under reflux, after which the ethanol is removed by concentration in vacuo. The residue obtained is taken up in 200 ml. of anhydrous toluene.

A solution of 8.85 g. (0.06 mol) of 2-piperidino-chloroethane (distilled) in 20 ml. of anhydrous toluene is then slowly added to the above mixture cooled to room temperature. The reaction mixture is heated with stirring for 15 hours until it boils under reflux. It is then cooled and filtered, and the filtrate is washed with water and extracted with a dilute aqueous solution of hydrochloric acid. The acid solution is made alkaline by the addition of a sodium hydroxide solution and the resulting oil is extracted with ether. It is dried and then concentrated. A solid residue of 11-(2-piperidino-ethoxy)-9,10-ethano-9,10-dihydro-anthracene is obtained.

3.33 g. (0.01 mol) of this solid are dissolved in 20 ml. of acetone, a solution of 1.2 g. of fumaric acid in 20 ml. of acetone being added to the resutling solution. After standing for 15 hours at 0° C., the resulting crystals are centrifuged and then recrystallised from acetone. The acid fumarate of 11-(2-piperidino-ethoxy)-9,10-ethano-9,10-dihydro-anthracene is obtained in the form of white crystals. M.P.: 193° C.–195° C., as measured on a heating stage microscope.

*Analysis.*—Calc'd for $C_{27}H_{31}NO_5$ (percent): C, 72.1; H, 7.0. Found (percent): C, 72.0; H, 6.8.

EXAMPLE 15

11-[(1-dimethylamino-2-propoxy)-methyl]-9,10-ethano-9,10-dihydro-anthracene hydrochloride (A) *Preparation of 1-dimethylamino-2-allyloxypropane.*—A mixture of 41.2 g. (0.4 mol) of 1-dimethylamino-2-propanol, 9.2 g. (0.4 at.-g.) of sodium and 50 ml. of anhydrous toluene is heated until it boils under reflux. After all the sodium has been dissolved, 48.4 g. (0.4 mol) of allyl bromide are slowly added, and the resulting mixture is heated with stirring for 2 hours until it boils under reflux. After cooling, it is filtered and the filtrate is extracted with a dilute aqueous solution of hydrochloric acid. The acid solution is made alkaline by the addition of a sodium hydroxide solution, and the resulting oil is extracted with ether. It is concentrated and distilled. 34.3 g. (60%) of 1-dimethylamino-2-allyloxypropane are obtained in the form of a colourless oil boiling at 140° C.–145° C.

(B) *Condensation.*—A mixture of 21.5 g. (0.15 mol) of 1-dimethylamino-2-allyloxypropane, 26.7 g. (0.15 mol) of anthracene and 0.4 g. of hydroquinone (in 50 ml. of toluene) is heated for 15 hours to 210° C. in an autoclave. After cooling, the reaction mixture is filtered and the filtrate is extracted with a dilute aqueous solution of hydrochloric acid. The acid solution is made alkaline by the addition of a sodium hydroxide solution and the resulting oil is extracted with benzene. It is concentrated in vacuo and the resulting oily residue is taken up in 200 ml. of anhydrous ether. Hydrochloric acid, in the form of a 7% solution in absolute ethanol, is then added until the product turns acid. After standing for 15 hours at 0° C., the resutling precipitate is centrifuged and recrystallised from a mixture of acetonitrile and ether. The hydrochloride of 11-[(1-dimethylamino-2-propoxy)-methyl]-9,10-ethano-9,10-dihydro-anthracene is obtained in the form of white crystals. M.P.: 195° C.–197° C., as measured on a heating-stage microscope.

*Analysis.*—Calc'd for $C_{22}H_{28}ClNO$ (percent): C, 73.8; H, 7.9. Found (percent): C, 73.8; H, 7.9.

EXAMPLE 16

11-(2-trimethylammonio-propoxymethyl)-9,10-ethano-9,10-dihydro-anthracene iodide 7.15 g. (0.02 mol) of 11-(2-dimethylaminopropoxymethyl)-9,10-ethano-9,10-dihydro-anthracene hydrochloride are dissolved in a little water. This solution is made alkaline by the addition of soda, after which it is extracted several times with benzene and dried, and the benzene is removed by distillation in vacuo. The residual oil is taken up in 200 ml. of anhydrous ether and 4.26 g. (0.03 mol) of methyl iodide are added. The product is left standing for 48 hours at room temperature, and the resulting precipitate is centrifuged. 7.5 g. (81%) of 11-(2-tri-methylammonio-propoxymethyl)-9,10-ethano-9,10-dihydro-anthracene iodide are obtained in the form of white crystals. M.P.: 147° C.–150° C., as measured on a heating stage microscope.

*Analysis.*—Calc'd for $C_{23}H_{30}INO$ (percent): C, 59.6; H, 6.5. Found (percent): C, 59.3; H, 6.4.

EXAMPLE 17

Tablets corresponding to the following formula were prepared:

11-(2-dimethylaminopropoxymethyl)-9,10-ethano-9,10-dihydro-anthracene HCl—50 mg.
Excipient: amount needed for a tablet completed at 410 mg.—lactose, starch, talcum and magnesium stearate.

EXAMPLE 18

Injections corresponding to the following formula were prepared:

11-(2-dimethylaminopropoxymethyl)-9,10-ethano-9,10-dihydro-anthracene HCl—100 mg.
Aqueous solute—5 ml.

EXAMPLE 19

1-(9,10-ethano-9,10-dihydro-11-anthryl)-ethanol

A solution of 70 g. (0.3 mol) of 11-formyl-9,10-ethano-9,10-dihydro anthracene in 300 ml. of anhydrous benzene is added dropwise with stirring to a solution of 0.36 mol of methyl-magnesium iodide in 500 ml. of anhydrous ether. The mixture is heated with stirring for 1 hour until it boils under reflux. After cooling, the reaction mixture is poured into a mixture of ice and ammonium chloride. The mixture is stirred until the magnesium hydroxide has been completely dissolved, after which the organic phase is separated off by decantation. It is concentrated in vacuo to dryness, 71 g. (95%) of 1-(9,10-ethano-9,10-dihydro-11-anthryl)-ethanol being obtained. This product is recrystallised from heptane. It is then in the form of white crystals. M.P. 168° C. as measured on a heating-stage microscope.

*Analysis.*—Calc'd for $C_{18}H_{18}O$ (percent): C, 86.4; H, 7.3. Found (percent): C, 86.2; H, 7.4.

EXAMPLE 20

2-(9,10-ethano-9,10-dihydro-11-anthryl)-ethanol (A) *9,10-ethano-9,10-dihydro-11-anthryl acetic acid.*—A solution of 50 g. (0.28 mol) of anthracene, 50 g. (0.58 mol) of vinyl acetic acid and 0.4 g. of hydroquinone in 300 ml. of benzene is heated for 15 hours to 200° C. in an autoclave. After cooling, the benzene solution is extracted with 250 ml. of 8% sodium hydroxide solution. This alkaline solution is acidified with a solution of conc. hydrochloric acid, the white precipitate formed being centrifuged and then washed with water. After drying, 54 g. (73%) of 9,10-ethano-9,10-dihydro-11-anthryl acetic acid are obtained in the form of white crystals. Instantaneous melting point on the Maquenne block: 188° C.–190° C. after recrystallization from n-heptane.

*Analysis.*—Calc'd for $C_{18}H_{16}O_2$ (percent): C, 81.8; H, 6.1. Found (percent): C, 81.5, H, 6.2.

(B) *9,10-ethano-9,10-dihydro-11-anthryl ethyl acetate.*—A solution of 39.6 g. (0.15 mol) of the above acid and 1.2 g. of p-toluene sulphonic acid in 500 ml. of anhydrous benzene and 50 ml. of absolute ethanol is heated to reflux, the water formed during the reaction being separated by azeotropic distillation. After the theoretical quantity of water has been removed, the solution is cooled, washed with a dilute solution of sodium bicarbonate and then with water, dried over sodium sulphate, concentrated and distilled. 34 g. (77.5%) of 9,10-ethano-9,10-dihydro-11-anthryl ethyl acetate are obtained in the form of a colourless oil which boils at 158° C.–160° C./ 0.1 mm. of mercury. This oil solidifies gradualy into white crystals which are insoluble in water. M.P.: 90° C., as measured on a heating-stage microscope.

(C) *2-(9,10-ethano - 9,10 - dihydro-11-anthryl)-ethanol.*—20 g. (0.0685 mol) of 9,10-ethano-9,10-dihydro-11-anthryl ethyl acetate in solution in 100 ml. of anhydrous ether are added to a suspension of 3.8 g. (0.1 mol) of lithium hydride and aluminium hydride in 100 ml. of anhydrous ether. The resulting mixture is boiled under reflux for 15 hours with stirring. After cooling, 20 ml. of ethyl acetate, 20 ml. of water and finally 50 ml. of 20% sulphuric acid are added. The ethereal phase is separated off by decantation, the aqueous phase is extracted with ether and the ethereal phases are concentrated in vacuo. The solid residue is recrystallised from a mixture of benzene and heptane. 12.5 g. (73%) of 2-(9,10-ethano-9,10-dihydro-11-anthryl)-ethanol are obtained in the form of white crystals. M.P.: 118° C.–120° C., as measured on a heating stage microscope.

*Analysis.*—Calc'd for $C_{18}H_{18}O$ (percent): C, 86.4; H, 7.3. Found (percent): C, 86.4; H, 7.3.

What is claimed is:

1. An aminoether derivative of 9,10-ethano-9,10-dihydro anthracene and their pharmaceutically acceptable acid addition and quaternary ammonium salts, said aminoether derivative corresponding to the formula:

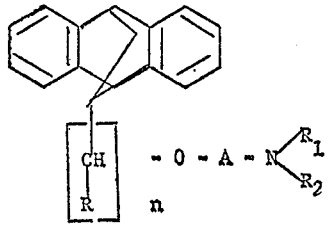

in which $n$ is an integer from 0 to 2, R represents a member selected from the group consisting of hydrogen and methyl, R being hydrogen when $n$ is 2, A represents an alkylene radical containing from 2 to 4 carbon atoms, and $R_1$ and $R_2$ are members selected from the group consisting of hydrogen, lower alkyl radicals and, $R_1$ and $R_2$ being taken as a whole together with the nitorogen atom to which they are attached, pyrrolidino, piperidino, morpholino and hexamethyleneimino radicals.

2. An aminoether derviative corresponding to the formula of claim 1, in which $n$ has the value 1, R represents hydrogen, A represents a

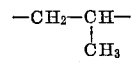

radical, and $R_1$ and $R_2$ represent methyl radicals.

3. An acid addition salt corresponding to claim 1, said acid addition salt being a salt of a compound corresponding to the formula of claim 1, which $n$ has the value 1, R represents hydrogen, A represents a

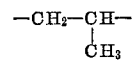

radical and $R_1$ and $R_2$ represent methyl radicals.

4. The hydrochloride of a compound corresponding to the formula of claim 1, in which $n$ has value 1, R is hydrogen, A represents a

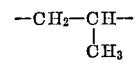

radical and $R_1$ and $R_2$ are methyl radicals.

5. An acid addition or a quaternary ammonium salt of a compound corresponding to the formula of claim 1, in which $n$ is equal to 0, A represents a —$CH_2$—$CH_2$— radical and $R_1$ and $R_2$ represent methyl radicals.

6. An acid addition or a quaternary ammonium salt of a compound corresponding to the formula of claim 1, in which $n$ is equal to 1, R is hydrogen, A represents a radical —$CH_2$—$CH_2$ and

represents a hexamethyleneimino radical.

References Cited

Wagner et al.: Synthetic Organic Chemistry, N.Y., John Wiley & Sons (1953), pp. 226–228.

ALEX MAZEL, Primary Examiner

B. I. DENTZ, Assistant Examiner

U.S. Cl. X.R.

260—570.7, 567.6, 294.7, 326.5, 247.7; 424—267, 274, 244, 278, 329, 325